United States Patent [19]

Kronenberger

[11] Patent Number: 5,404,593
[45] Date of Patent: Apr. 11, 1995

[54] HEADWEAR PIECE WITH ORNAMENTAL ILLUMINATION

[75] Inventor: Robert A. Kronenberger, Deerfield, Ill.

[73] Assignee: American Needle, Buffalo Grove, Ill.

[21] Appl. No.: 19,091

[22] Filed: Feb. 18, 1993

[51] Int. Cl.⁶ ................................................ A42C 5/00
[52] U.S. Cl. .................................... 2/195.1; 2/906; 362/106
[58] Field of Search .................. 2/171, 175.1, 175.3, 2/195.1, 195.7, 209.13, 905, 906; 362/32, 105, 106

[56] References Cited

U.S. PATENT DOCUMENTS

| | | |
|---|---|---|
| 3,675,005 | 7/1972 | Curiel ................................... 362/32 |
| 4,667,274 | 5/1987 | Daniel .................................. 362/106 |
| 5,053,929 | 10/1991 | Le Gars ................................ 362/32 |
| 5,111,366 | 5/1992 | Rife et al. ............................ 362/106 |
| 5,147,129 | 9/1992 | Ku ....................................... 362/106 |

Primary Examiner—Clifford D. Crowder
Assistant Examiner—Diana L. Biefeld
Attorney, Agent, or Firm—Wood, Phillips, VanSanten, Clark & Mortimer

[57] ABSTRACT

A headwear piece having a crown defining a receptacle for the head of a wearer and illumination structure on the crown for projecting an unfocused light as an adornment to the crown to be visible from externally of the crown.

10 Claims, 2 Drawing Sheets

HEADWEAR PIECE WITH ORNAMENTAL ILLUMINATION

BACKGROUND OF THE INVENTION

1. Field of the Invention

This invention relates to headwear and, more particularly, to headwear with ornamental illumination thereon to enhance the appearance of the headwear.

2. Background Art

In the highly competitive headwear industry, manufacturers are constantly striving to provide to the consumer headwear with a novel and eye catching appearance. Heretofore, these efforts have been focused primarily on changing shape and producing different color schemes and designs on the headwear.

SUMMARY OF THE INVENTION

The present invention has as its principal objective the provision of a headwear piece that has an enhanced appearance achieved through the use of decorative illumination.

More particularly, a headwear piece is provided having a crown defining a receptacle for the head of a wearer and illumination structure on the crown for projecting an unfocused light as an adornment to the crown to be visible from externally of the crown.

In one form, the illumination structure includes a source of light and at least one optical fiber, with the light source and optical fiber mounted to the headwear so that the light from the light source projects through the optical fiber to disperse the light from the light source.

The optical fiber is desirable because of its flexibility, small size, and ability to distribute the light over predetermined portions of the crown so as to light a substantial portion of the crown and/or provide a localized design thereon, as desired. Optical fibers have the ability to disperse light from a single source which is an ideal characteristic for headwear pieces on which large and/or heavy illumination structures are normally impractical.

In one form, the crown has at least a portion that is defined by first and second flexible layers, at least one of which is light transmissive. The light source is mounted between the first and second flexible layers to project light through the one light transmissive layer to externally of the crown.

The light transmissive layer can be colored or a design placed thereon to highlight a logo, project a contrasting color, or the like.

The crown has an external surface. The external surface has a portion from which light from the light source projects. The illumination structure does not provide an obtrusive addition to the headwear piece and can be configured so as not to alter the basic shape of the headwear piece. The projecting light can pass through an optional light transmissive layer or project directly from an exposed element, such as an optical fiber.

The headwear piece can be a self-contained unit. A power source can be integrated into the hat. In normal headwear, the crown has an inverted cup-shaped configuration with there being a space between a wearer's head and the top of the crown with the headwear piece in place. The power source can be mounted within this space so as not to interfere with the fit of the headwear piece.

The illumination can be enhanced by using multiple fibers in a more complex arrangement in the same fashion as the one optical fiber.

The invention further contemplates a headwear piece having a crown and a rim, mounted to and projecting away from the crown, with the illumination structure being on at least one of the crown and rim.

Still further, the invention contemplates a headwear piece having a crown and illumination structure mounted to the crown so that that portion of the illumination structure from which light projects does not protrude appreciably from the external surface of the crown.

Still further, the invention contemplates a headwear piece having a crown with at least one optical fiber mounted to the crown so that light from a source directed at the optical fiber projects through the optical fiber to be visible from externally of the crown.

Additional optical fibers or a network thereof can be used to practice the invention. The optical fiber(s) can also formed into a three dimensional shape externally of the crown to provide a different type of adornment.

DETAILED DESCRIPTION OF THE DRAWINGS

Figure 1:
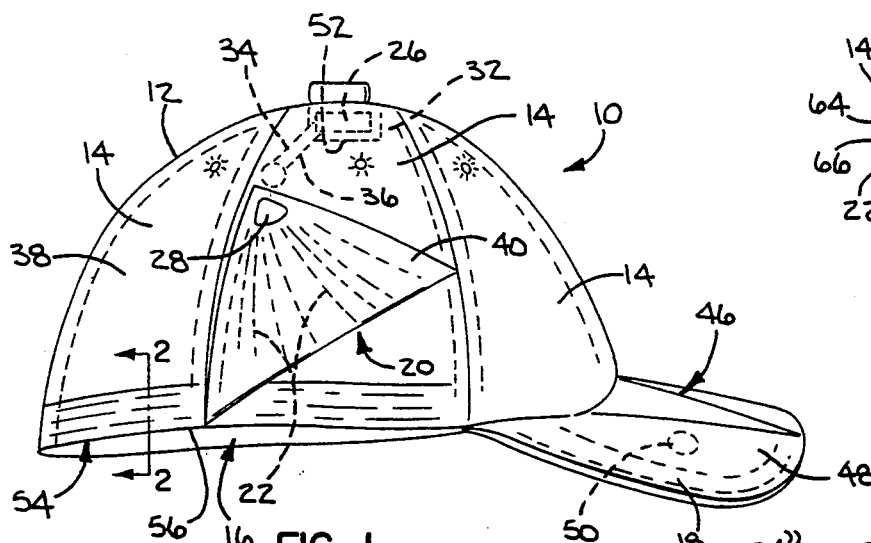
FIG. 1 is a side elevation view of a headwear piece having illumination structure, according to the present invention, incorporated therein.

In FIG. 1, a headwear piece, according to the present invention, is shown at 10. The headwear piece 10 has a crown 12 defined by a plurality of gores/panels 14 stitched together in edge-to-edge relationship to define an inverted, cup-shaped receptacle 16 for the head of a wearer. A rim/visor 18 is connected to the crown 12 and projects forwardly therefrom to shield the face of a wearer from sun and the elements.

The headwear piece 10 is a baseball-style cap and is only exemplary of the many different headwear configurations contemplated for incorporation of the present invention. The baseball-style cap is used herein only for purposes of demonstrating the principles of the present invention.

The present invention contemplates the illumination of selected areas of the crown 12 and/or rim 18, preferably using at least one optical fiber, and more preferably a network thereof. The principle of fiber optics operation is well known to those skilled in the art and normally relies on thin glass fibers to transmit light from a source with limited reduction in light intensity under the phenomenon of total internal reflection. Typically, the optical fiber has a cylindrical core that is usually glass or plastic coated with a material having a lower refractive index. This allows the optical fibers to be flexible to conform to curved shapes, such as the curvature of the crown 12 on the headwear piece 10.

FIG. 1 shows three different exemplary patterns of illumination using the inventive concept. In one of these forms, an illumination means at 20 is defined on one of the panels 14. Individual optical fibers 22 are arranged on the panel 14 to define a triangular configuration which gives a swept back appearance. Before further describing details of the invention, reference is made to FIG. 7 relative to which basic optical fiber operation is explained.

Figure 7:
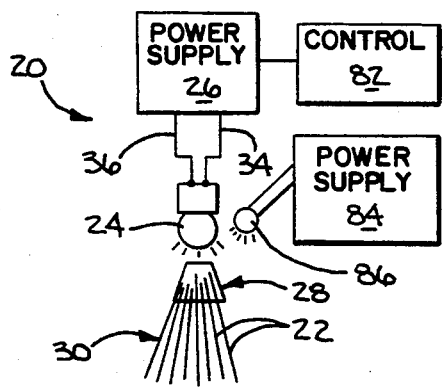
FIG. 7 is a schematic representation of an illumination structure, according to the present invention, including optical fibers.

In FIG. 7, the illumination means 20 is shown schematically. Briefly, the illumination means 20 includes a light source 24 with a supply 26 being optionally provided to power the light source 24. The individual optical fibers 22 are bundled at an end 28 which is the point where the light from the light source 24 impinges on the optical network 30. At the end 28, the light from the source 24 is concentrated and disperses through the fibers 22, which are very small in diameter and flexible.

The incorporation of the illumination means 20 into the headwear piece 10 will be described now with respect to FIG. 1. The power supply 26 can be conveniently located in a space 32 at the top of the crown 12. With the headwear piece 10 in place on a wearer's head, this space 32 affords a suitable receptacle for the power supply 26 without any interference between the power supply 26 and the wearer's head. Similarly, the bundled end 28 of the optical network 30 can be located sufficiently upwardly in the crown 12 to reside in the space 32. Leads 34, 36 electrically connect the light source 24 to the power supply 26 and can be incorporated into the crown 12 without affecting the fit of the headwear piece.

The baseball-style cap is typically defined by fabric, with the crown 12 remaining substantially flexible. The individual fibers 22 can be placed directly against the external surface 38 of the crown 12 and suitably held in place, as by strips or an adhesive to the crown 12. The optical fibers 22 are sufficiently thin that they do not project appreciably from the external surface 38 of the crown, and by reason of being conformable to the curvature of the crown 12, can be incorporated without altering the overall shape of the headwear piece 10. A light transmissive layer 40 is placed over the optical fiber network 30 to shield the fibers 22.

Figure 6:
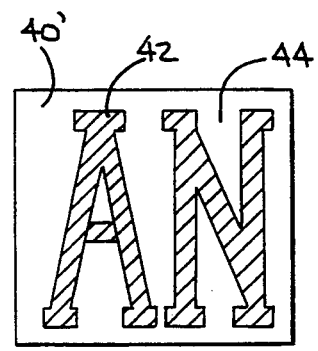
FIG. 6 is a front elevation view of a light transmissive layer with a logo thereon which can be attached to the crown to allow transmission of light therethrough from the illumination structure.

The light transmissive layer 40 can be colored or incorporate a design, such as a logo, which is highlighted by the projection therethrough of light from the source 24. In FIG. 6, a modified form of light transmissive layer 401 is shown and has a contrasting logo 42 incorporated therein. The logo 42 can be light transmissive or can block the transmission of light so that the logo 42 contrasts with the background portion 44 of the layer 401 through which light passes.

FIG. 1 shows an alternative location for one or more optical fibers at 22. The optical fiber(s) 22 is incorporated into the rim 18 at 46 on the headwear piece. The layers defining the rim 18 could be cut out to accommodate the optical fiber(s) 22 or, alternatively, the fiber(s) 22 could be placed directly against the external surface 48 of the rim 18. A power supply 50 can be attached to the rim 18, or, alternatively, the fiber(s) 22 could be illuminated from a light source (not shown) connected to the power supply 26 at the top of the crown 12.

Suitable power supplies 26 are also well known to those skilled in the art. Small, disk-shaped batteries, such as those used in cameras, can be conveniently incorporated into the headwear piece 10, on either of the crown 12 and rim 18. In FIG. 1, a strap 52 is shown to capture the power supply 26 against the crown 12.

Figure 2:
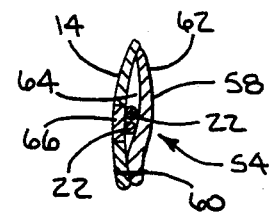
FIG. 2 is a cross-sectional view of the illumination structure at the bottom portion of the crown, taken along line 2—2 of FIG. 1.

In FIGS. 1 and 2, another suitable location for the incorporation of one or more optical fibers is shown at 54, adjacent to the bottom edge 56 of the crown 12. Typically, a sweat band 58 is attached by stitching 60 at the bottom of the crown 12 to be foldable inwardly to define a continuous surface 62 that embraces the head of a wearer. An annular pocket 64 is defined between the sweat band 58 and the panels 14. In this case, two fibers 22 are shown mounted within the pocket 64.

A cut-out 66 at the bottom of the panels 14 allows light from the fibers 22 to project through the panels 14. As a substitute for the cut-out 66, a light transmissive material can be integrated into the panels 14 to allow light from the fibers 22 to project therethrough so as to be visible from externally of the headwear piece 10.

Figure 4:
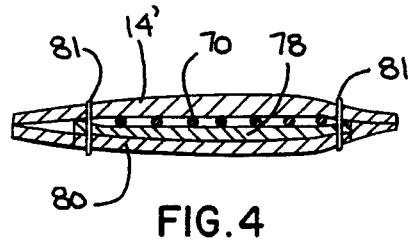
FIG. 4 is a cross-sectional view of a portion of the logo on the front of the head wear piece taken along line 4—4 of FIG. 3 and showing illumination structure in the form of an optical fiber sheet/network.
Figure 3:
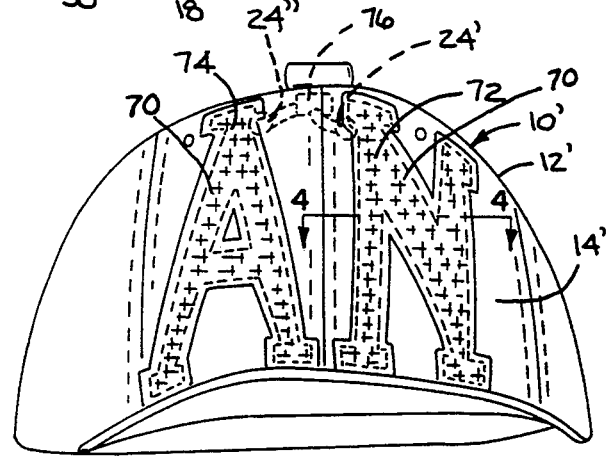
FIG. 3 is a front elevation view of a headwear piece with a modified form of illumination structure according to the present invention in the form of a logo.
Figure 5:
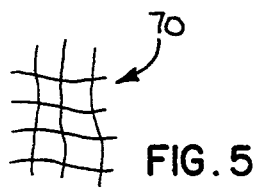
FIG. 5 is a schematic representation of the optical fiber sheet/network in FIGS. 3 and 4.

In FIGS. 3–5, a modified form of fiber network is shown on the headwear piece 10', which is in all other material respects the same as the headwear piece 10. The headwear piece 10' has incorporated therein a meshed optical fiber network/sheet 70. The optical fiber network 70 is intended to be a generic representation of various panels that are commercially available, including those currently available through the company Lumitex, Inc. The optical network 70 can be formed into desired shapes, such as letters, as shown at 72, 74 in FIG. 3 and projects light directed thereat substantially uninterruptedly over a substantial area. The operation of the illumination means in FIG. 3 is substantially the same as that previously discussed but may include a separate light source 24', 24" for each letter 72, 74. A single power supply 76, or separate power supplies (not shown) can be provided for each letter 72, 74.

The optical network/sheet 70 can be incorporated into the crown 12' in a variety of different manners. In FIG. 4, one arrangement is shown wherein the fiber network/sheet 70 is captive between the panels 14' and a light transmissive layer 78 which, in turn, has an overlying layer 80, with the three layers 14', 78, 80 held together by stitching 81 in such a manner that the fiber network/sheet 70 is captive in a desired location on the headwear piece 10'. The outer layer 80 can be cut out selectively to expose a part of the light transmissive layer 78 or to completely expose the layer 78 for projection therethrough of light from the network/sheet 70. In the former, the layer 80 can serve as a mask for selectively blocking portions of the layer 78. However, the layer 80 is optional.

Another aspect of the invention is the incorporation of a control means 82 for selectively turning the power supply 26 on and off. The control means 82 can take a variety of different forms. For example, the control means 82 can be a simple on/off switch. The control means 82 could, alternatively, be a timer that turns the power supply 26 on and off at regular intervals. The control means 82 might be a switch that changes states depending upon the attitude of the headwear piece 10, 10'. For example, a mercury-type switch might be incorporated to place the illumination means 20 on and off only with the headwear piece 10, 10' in a horizontal position.

A further modification of the illumination means 20 is shown schematically in FIG. 7 to include a second power supply 84 and a second light source 86 connected to the power supply 84. The light source 86 can be made to be a different color than the light source 24 to add more versatility to the illumination means 20. The control 82 can be functional to alternately turn on and off the power supplies 26, 84.

Figure 8:
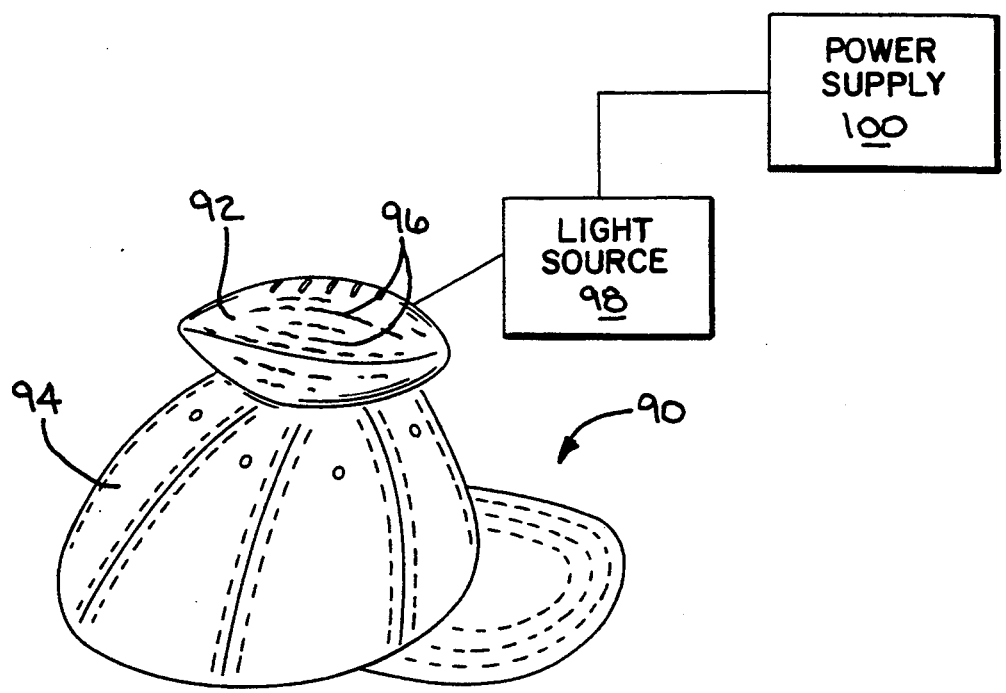
FIG. 8 is a perspective view of a headwear piece with a three-dimensional object positioned externally of the crown and illuminated according to the present invention.

A further modification of the inventive structure is shown on the headwear piece at 90 in FIG. 8. The headwear piece 90 has a three dimensional object 92 attached to the crown 94 thereof. The object 92 is at least partially outlined by a network of fibers 96 which project light from a source 98 operated by a power supply 100.

It can be seen that with the present invention, ordinary headwear can be adorned to be very eye catching. There are virtually limitless variations of patterns, colors, on/off variations, etc. contemplated by the invention.

The foregoing disclosure of specific embodiments is intended to be illustrative of the broad concepts comprehended by the invention.

I claim:

1. A headwear piece comprising:
   a crown defining a receptacle for the head of a wearer and having an external surface;
   a rim projecting angularly away from the crown; and
   illumination means on the crown for projecting an unfocused light as an adornment to the crown to be visible from externally of the crown,
   said illumination means comprising a source of light, at least one optical fiber, and means for mounting the light source and optical fiber to at least one of the crown and rim so that light from the light source projects through and from the at least one optical fiber,
   said at least one optical fiber being arranged to cause light to project therefrom substantially uninterruptedly over a substantial area of at least one of the rim and the crown external surface.

2. The headwear piece according to claim 1 wherein the crown has at least a portion that is defined by first and second flexible layers, at least one of the first and second flexible layers is light transmissive, and the light source is mounted to the crown to project light directly outwardly through the at least one of the first and second flexible layers to externally of the crown over a substantial area of the crown external surface.

3. The headwear piece according to claim 2 wherein the at least one of the first and second layers has a design thereon that is highlighted by light from the light source passing through the at least one of the first and second layers and the at least one of the first and second layers does not project significantly outwardly from the external surface of the crown.

4. The headwear piece according to claim 1 wherein the illumination means includes a source and a source of power for the light source and there are means for mounting the power source within the crown receptacle.

5. The headwear piece according to claim 4 wherein the crown has an inverted cup shape and with the headwear piece in place on a wearer's head there is a space between the top of the crown and a wearer's head and the power source is mounted within the space so as not to interfere with the fit of the headwear piece.

6. The headwear piece according to claim 1 wherein the illumination means comprise a plurality of optical fibers cooperatively defining a shape distinct from the shape of the crown and the light source mounting means mounts the light source so that light projects from the light source through the plurality of optical fibers.

7. The headwear piece according to claim 1 wherein the illumination means does not project appreciably outwardly from the external crown surface.

8. The headwear piece according to claim 1 wherein the illumination means includes a plurality of optical fibers that are arranged to project light from the external surface of the crown in a continuous pattern over a substantial area on the external surface of the crown.

9. The headwear piece according to claim 8 wherein the optical fibers have portions from which light from the source projects and the optical fiber portions cooperatively define a continuous pattern visible from externally of the crown.

10. The headwear piece according to claim 9 wherein the fiber portions define a logo.

* * * * *